(12) United States Patent
Bulat

(10) Patent No.: US 8,955,324 B2
(45) Date of Patent: Feb. 17, 2015

(54) COMBUSTION ARRANGEMENT AND TURBINE COMPRISING A DAMPING FACILITY

(75) Inventor: Ghenadie Bulat, Lincoln (GB)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 14/237,870

(22) PCT Filed: Jul. 24, 2012

(86) PCT No.: PCT/EP2012/064528
§ 371 (c)(1),
(2), (4) Date: Feb. 8, 2014

(87) PCT Pub. No.: WO2013/023886
PCT Pub. Date: Feb. 21, 2013

(65) Prior Publication Data
US 2014/0196468 A1   Jul. 17, 2014

(30) Foreign Application Priority Data
Aug. 17, 2011   (EP) .................................... 11177779

(51) Int. Cl.
*F02C 7/24* (2006.01)
*F23R 3/26* (2006.01)
*F23R 3/54* (2006.01)

(52) U.S. Cl.
CPC ... *F23R 3/26* (2013.01); *F23R 3/54* (2013.01); *F02C 7/24* (2013.01); *F23R 2900/00013* (2013.01)
USPC .......................................................... 60/725

(58) Field of Classification Search
USPC ............ 60/725, 752–760, 782, 785; 181/210; 431/114
See application file for complete search history.

(56) References Cited

U.S. PATENT DOCUMENTS

| | | | |
|---|---|---|---|
| 3,620,013 A * | 11/1971 | Rogers et al. ................... | 60/725 |
| 4,122,674 A | 10/1978 | Andersson | |
| 5,373,695 A * | 12/1994 | Aigner et al. ................... | 60/804 |
| 5,537,864 A | 7/1996 | Sood | |
| 6,351,947 B1 * | 3/2002 | Keller et al. .................... | 60/725 |
| 6,464,489 B1 | 10/2002 | Gutmark | |
| 6,640,544 B2 * | 11/2003 | Suenaga et al. ................ | 60/725 |

(Continued)

FOREIGN PATENT DOCUMENTS

EP    2146057 A1   1/2010
WO   2011157548 A1   12/2011

*Primary Examiner* — Phutthiwat Wongwian
(74) *Attorney, Agent, or Firm* — Beusse Wolter Sanks & Maire, PA

(57) ABSTRACT

A combustion arrangement for a turbine is provided including: a casing; a combustion chamber within the casing, an inner casing volume may be defined as a volume inside the casing but outside the combustion chamber; a partitioning wall partitioning the inner casing volume into first and second volume portions, the partitioning wall may have at least one aperture to allow fluid communication between the first and second volume portions; and a valve may be arranged at the casing to allow an outgoing fluid flow from the inner casing volume to an outside of the casing depending on a valve operating position. The combustion chamber has a combustion entry port for supplying an oxidant into the combustion chamber, where the combustion entry port may be in fluid communication with the first volume portion. The arrangement may be adapted to adjust the valve operating position for damping an oscillation of the arrangement.

15 Claims, 2 Drawing Sheets

(56) References Cited

U.S. PATENT DOCUMENTS

| | | |
|---|---|---|
| 6,920,758 B2 * | 7/2005 | Matsuyama et al. ............. 60/725 |
| 7,708,518 B2 * | 5/2010 | Chehab ......................... 415/115 |
| 7,788,926 B2 * | 9/2010 | Johnson et al. ................. 60/725 |
| 8,413,451 B2 | 4/2013 | Senior |
| 8,733,496 B2 * | 5/2014 | Ono et al. ..................... 181/213 |
| 2007/0169992 A1 * | 7/2007 | Wasif et al. ................... 181/293 |
| 2007/0256889 A1 * | 11/2007 | Yu et al. ........................ 181/214 |
| 2008/0057848 A1 | 3/2008 | Gray |
| 2010/0011779 A1 | 1/2010 | Senior |
| 2010/0175387 A1 | 7/2010 | Foust |
| 2010/0186411 A1 * | 7/2010 | Matsuyama et al. ............ 60/725 |
| 2013/0213056 A1 | 8/2013 | Bulat |

* cited by examiner

COMBUSTION ARRANGEMENT AND TURBINE COMPRISING A DAMPING FACILITY

CROSS REFERENCE TO RELATED APPLICATIONS

This application is the US National Stage of International Application No. PCT/EP2012/064528 filed Jul. 24, 2012, and claims the benefit thereof. The International Application claims the benefit of European Application No. EP11177779 filed Aug. 17, 2011. All of the applications are incorporated by reference herein in their entirety.

FIELD OF INVENTION

The present invention relates to a combustion arrangement, to a turbine comprising the combustion arrangement and to a method for operating a combustion arrangement.

BACKGROUND OF INVENTION

A combustion arrangement of a gas turbine usually comprises a combustion chamber which is arranged within an outer casing and which defines a space for burning a mixture of fuel and compressed air. One example of such a combustion arrangement is a dry low emission (DLE) combustion arrangement which operates on a lean mixture of fuel and compressed air, thereby producing a low amount of emissions, (e.g., different kinds of nitrogen oxides and carbon monoxide).

It may be commonly known that pressure oscillations may arise within the combustion chamber during operation of the gas turbine which may influence operational conditions of the combustion chamber and which may thus hamper a performance or life of the combustion chamber. In particular, the performance or efficiency of the gas turbine may be reduced due to these oscillations.

These pressure oscillations may be generated due to combustion flow dynamics of gases within the combustion chamber, particularly due to the lean mixture of air and fuel which is used for DLE. Combustion flow dynamics may be generated by flame excitation or aerodynamic induced excitation within the combustion chamber during the burning process. Further, insufficient damping of a housing of the combustion chamber may also contribute to pressure oscillations within the combustion chamber, since oscillations of the housing may change the space defined by the combustion chamber housing.

Further pressure oscillations within the combustion chamber may evolve due to gas flow dynamics particularly of compressed air (as an oxidant of the combustion process) in a space defined between the outer wall or casing of the combustion arrangement and an outer wall of the combustion chamber particularly upon this gas flow entering the combustion chamber. For example, when a swirler is arranged at a supply inlet or port of the combustion chamber, flow dynamics within the combustion chamber may be modified such that pressure oscillations within the combustion chamber may arise. It may be generally desired that a gas inlet flow comprising a high Mach number may be present to decouple the combustion chamber from pressure oscillations arising from an outer flow surrounding the combustion chamber.

In order to damp such pressure oscillation within the combustion chamber, different measures are known. A geometry of the combustion chamber may be modified in that, for example, a length extension of the combustion chamber may be changed.

Further, a damping device may be arranged within the combustion chamber or outside of the combustion chamber, in order to damp the amplitude of particular frequencies or even frequency spectra of the pressure oscillations. Such damping devices may be particularly arranged at pressure oscillation anti-nodes. Arranging damping devices in such a way that the damping devices may surround the combustion chamber but being spaced from an inlet supply to the combustion chamber may offer an undisturbed gas flow (in particular flow of compressed air) into the combustion chamber. However, the full load characteristics of the combustion chamber may be altered, eventually leading to increased combustion dynamics within the combustion chamber in terms of unintentionally generating oscillation resonance of pressure oscillations within the combustion chamber. A frequency or frequency spectrum of pressure oscillations within the casing of the combustion chamber and/or a vortex shedding may then not sufficiently be damped.

Most DLE combustion systems are prone to combustion dynamics due to a lean mixture of air and fuel (to produce low amounts of nitrogen oxides). Combustion dynamics may arise as a result of flame excitation, aerodynamics-induced excitation or insufficient clamping. U.S. Pat. No. 4,122,674 discloses a burner can, including a noise suppressing cavity, for use in the combustor assembly of a gas turbine engine to minimize the combustion noise emitted by the engine, wherein the cavity is mounted at an end of the burner can that includes a fuel nozzle for injection of fuel into the interior of the burner can and is in acoustic communication with the interior of the burner can via a perforated metal sheet that forms a partition between the burner can and the cavity.

However, the above described measures may result in a poor damping of pressure oscillations within the combustion chamber.

SUMMARY OF THE INVENTION

There may be a need for a combustion arrangement, for a turbine, in particular a gas turbine, and for a method for operating a combustion arrangement, wherein disturbing oscillations having a negative impact on the efficiency of the combustion arrangement, or the turbine, may be reduced or damped.

In order to achieve or meet the need defined above, a combustion arrangement, a turbine and a method for operating a combustion arrangement are provided.

According to an embodiment of the present invention, a combustion arrangement (for burning in particular a mixture of fuel and an oxidant, in particular an oxygen containing reaction partner, in particular compressed air) comprises a casing (which may in particular be manufactured from metal material, in particular having an annular shape around an axial direction); a combustion chamber (in which combustion of the mixture of the fuel and the oxidant takes place in a flame, in particular within a predetermined location within the combustion chamber); a partitioning wall (comprising in particular also metal material); and a valve. Thereby, the combustion chamber is arranged within the casing (wherein in particular an outlet of the combustion chamber may be arranged outside the casing, but a center of the combustion chamber, where the flame is ignited, or a major portion of the combustion chamber is arranged within the casing), wherein an inner casing volume is defined to be a volume inside the casing but outside the combustion chamber. The partitioning wall partitions the inner casing volume into a first volume portion and a (different, in particular smaller) second volume portion, wherein the partitioning wall has at least one aperture (or more preferably a plurality of apertures, in particular being distributed along a circumferential direction, in particular having a same circumferential distance from each other) to allow fluid communication (in particular fluid communication of the oxidant) between the first volume portion and the second volume portion (wherein in particular a directional fluid communication from the first volume portion into the second volume portion is enabled and/or a directional fluid communication from the second volume portion into the first volume portion is enabled). Further, the valve is arranged at the casing (in communication with the first volume portion and/or with the second volume portion) to allow an outgoing fluid flow (in particular of the oxidant) from the inner casing volume (in particular from the second volume portion of the inner casing volume) to flow outside the casing (for example to an exhaust section, to an intake section, to a compressor section or to a turbine section, when the combustion arrangement is comprised within a gas turbine, or a cooling pipe being used for cooling purposes) depending on a valve operating position (in particular defining the degree of opening of the valve). Further, the combustion chamber has a combustion entry port for supplying an oxidant into the combustion chamber, wherein the combustion entry port is in fluid communication with the first volume portion (wherein in particular the oxidant flows within the first volume portion, in particular flowing around an outside of the combustion chamber along delimiting walls of the combustion chamber, wherein the flow of the oxidant within the first volume portion contacts outer surfaces of walls delimiting the combustion chamber and is directed into an inside of the combustion chamber), wherein the arrangement is adapted to adjust (in particular to change, to regulate) the valve operating position (in particular the degree of opening or degree of closing of the valve) for damping (in particular reducing an amplitude) an oscillation (in particular a pressure oscillation within the combustion chamber, within the inner casing volume or an oscillation of the entire combustion arrangement) of the arrangement.

Thereby, the partitioning wall may be fixed at a radially outer portion of a wall delimiting the casing and may further be fixed at a radially inner portion of the wall delimiting the casing. In particular, the partitioning wall may be arranged or placed at a particular position and according to a particular orientation, in order to partition the inner casing volume such that a particularly disturbing resonance oscillation as defined by the geometry, the material and the nominal operation condition of the combustion arrangement, is reduced or even avoided. Thereby, the position at which the partitioning wall is attached or fixed at the casing at the radially outer portion and the radially inner portion, may be adjusted properly. Further, the partitioning wall may be placed within the inner casing volume such that the fluid flow of the oxidant is not significantly disturbed, in particular, when the valve is completely closed. Thus, the partitioning wall may be placed within the inner casing volume such that it is not directly in the way of the fluid flow of the oxidant towards the combustion entry port.

It has been observed that the fluid flow of the oxidant (in particular compressed air) surrounding the combustion chamber, has an influence on the internal combustion flows, if the Mach number through the swifter is relatively low. In particular, by adjusting the valve operating position, a particular amount of the compressed air may be branched-off such that the fluid flow surrounding the combustion chamber may be changed. Thereby, the damping function of the fluid flow may be altered, in particular in order to alter the damping capability for damping an oscillation having a particular frequency, corresponding to the geometry, particularly the aperture size and number of apertures, of the partitioning wall.

In particular, depending on an operating condition of the combustion arrangement (such as combustion exit temperature, ingoing fluid flow of the oxidant into the first volume, fuel flow towards the combustion chamber, temperature, etc.) the combustion arrangement (or a component thereof) may oscillate at a particular frequency or frequency range. In particular, the amplitude of the oscillation may depend on the operation condition if the combustion arrangement.

By providing the opportunity to branch-off a portion of the supplied oxidant, the amplitude of the oscillation, which is damped by the fluid flow of the oxidant surrounding (and/or entering) the combustion chamber (within the inner casing volume) may be changed or altered. Thereby, an efficient damping of the combustion arrangement may be achieved for different operational conditions, in particular for different loads.

In particular, the load may be altered to be within 50% and 90% of a nominal load of the combustion arrangement. Oscillations excited during or for these different loads, may be effectively damped by the combustion arrangement according to an embodiment of the present invention by properly adjusting the valve operating positions.

The valve may also be denoted as bleed valve. In particular, the bleed valve allows to preset (in particular in combination with other control valve(s)) a flow velocity (or mass flow or flow rate) of the oxidant supplied to the first volume portion (and/or to the combustion chamber). In particular, the valve may allow to actively control the flow velocity of the oxidant (in particular compressed air).

During operation of the combustion arrangement, the valve operating position may either be fixed or may be continuously changed. A fixed valve operating position may be adjusted depending on the nominal operating conditions of the combustion arrangement (which may in particular define an amplitude of a resonance oscillation). Alternatively, the valve operating position may continuously be regulated or adjusted based on measured operating properties of the combustion arrangement.

According to an embodiment of the present invention, the valve is arranged to allow the fluid flow (directionally) from the second volume portion to flow outside of the casing depending on a valve operating position.

While the combustion entry port is in fluid communication with the first volume portion, the valve may be arranged within the second volume portion or at least in communication with the second volume portion. Thereby, the second volume portion may in particular be arranged downstream of the first volume portion. Thereby, "downstream" is understood to be related to a flow direction of the mixture of fuel and the oxidant, i.e, a flow direction of the reaction products flowing through and out of the combustion chamber. In particular, the partitioning wall (in particular a perforated plate) may be arranged (in particular axially) downstream of the center or an axial position of the center) of the combustion chamber. Thereby, in particular when the combustion chamber is of a can type, wherein further in particular a plurality of can type combustion chambers are circumferentially arranged around an axial direction, the center of the combustion chamber may be defined to be a center of mass of the combustion chamber located in an inside of the combustion chamber. If the combustion chamber is of an annular type spanning a whole circumference, the center of the combustion chamber may be defined to be a center of mass of the combustion chamber located outside of the combustion chamber. Further in particular, an axial position of the center of the combustion chamber may be defined as the axial component of the center of the combustion chamber. Further in particular, an axial position of the center of the combustion chamber may be defined as an intended axial position (or an average of axial positions) of one or more flames in the combustion chamber.

Further in particular, the valve may be arranged in fluid communication with the second volume portion, wherein the valve may be arranged downstream the partitioning wall. In particular, the partitioning wall may be arranged within the inner casing volume, where a relatively stagnant flow of the oxidant is present, in particular under normal operation conditions of the combustion arrangement. By this placement or this positioning of the valve, the flow of the oxidant towards the combustion chamber may not significantly be disturbed, in order to maintain an efficient combustion process.

Further, by this placement or this positioning of the valve, the flow of the oxidant in the downstream region (in particular the second volume portion) may result in improved heat transfer from (in particular cooling of) hot parts or components in this downstream region, in particular hot components of a high pressure turbine section, when the combustion arrangement is used for a gas turbine.

According to an embodiment of the present invention, the casing further comprises a casing entry port for supplying an ingoing fluid flow of oxidant (in particular comprising compressed air) into the first volume portion, wherein the valve is adapted to adjust the valve operating position such that between 0% and 20%, in particular between 0% and 10%, of the ingoing fluid flow of the oxidant supplied to the first volume portion is led, in particular via the second volume portion, to flow outside of the casing.

By branching-off between 0% and 20% of the ingoing fluid flow, a relatively wide range of oscillations (in particular having different frequencies within a particular frequency range) may have their amplitude effectively damped.

In particular, the casing entry port may be remote from the combustion entry port, in particular may be arranged downstream of the combustion entry port. Thereby, the ingoing fluid flow of the oxidant e g supplied from by compressor or an air storage may comprise a section, wherein the ingoing fluid flow is in the downstream direction. After having flown along the downstream direction (or at least having a component in the downstream direction), the ingoing flow may turn its flow direction such that the inflow direction is in the upstream direction (or at least having a component in the upstream direction). Thereby, the ingoing fluid flow may surround outer walls of the combustion chamber. The ingoing fluid flow may flow around the combustion chamber until the combustion entry port (in particular arranged at an upstream portion of the combustion chamber) is reached. Here, the ingoing fluid flow of the oxidant may be directed to enter the inside of the combustion chamber in which the oxidant is mixed with fuel and burnt (in particular at a particular intended flame position within the combustion chamber).

According to an embodiment of the present invention, the arrangement is adapted to adjust the valve operating position based on a frequency (in particular main frequency) of the oscillation (in particular having a highest amplitude). In a conventional approach, a partitioning wall may only be used to damp a single frequency of the whole system. However, the oscillation frequency may depend on other parameters than the geometry of the arrangement.

In particular, the frequency of the oscillation having the highest amplitude, may depend on a number of operational parameters of the combustion arrangement, which may be changed during operation of the combustion arrangement. In particular, the frequency of the oscillation having the highest amplitude, may be determined based on a simulation of the system. Further, the damping effect of branching-off different amounts of the ingoing fluid flow may also be simulated and the valve may be adjusted based on the simulation. In particular, adjusting the valve operating position, may change the oscillation frequency of the combustion arrangement or a component of the combustion arrangement such that it is no longer in resonance. Further, adjusting the operating valve position may change an amplitude of an oscillation having a particular frequency or having a range of frequencies.

Thereby, an effective damping of the combustion arrangement may be achieved, in particular in order to improve the efficiency of the combustion arrangement and in order to avoid damage of components of the combustion arrangement during operation.

According to an embodiment of the present invention, the arrangement is adapted to adjust the valve operating position to increase the fluid flow through the valve (in particular from the second volume portion to flow outside of the casing), if the frequency of the oscillation to be damped have an amplitude above a threshold or limit value. Thus, if it is desired to damp an oscillation having a frequency, which is different than the frequency of the oscillation, previously damped, the fluid flow through the valve may be changed i.e. increased or decreased. Thereby, a desired oscillation to be damped may be reduced in its amplitude. Thereby, a proper operation of the combustion arrangement may be ensured.

According to an embodiment of the present invention, the combustion arrangement further comprises a controller communicatively connected to the valve in particular comprising electrical and/or optical communication lines), wherein the controller is adapted to adjust (in particular by supplying a control signal, such as an electrical control signal or an optical control signal), the valve operating position based on an operating state of the combustion arrangement.

In particular, the controller may comprise processing capabilities in order to determine a valve operating position based on the operating state of the combustion arrangement. In particular, the controller may perform a simulation of the combustion arrangement in order to determine oscillations of the combustion arrangement in different operating states of the combustion arrangement. Further, the controller may simulate the effect of the fluid flow of the oxidant (in particular compressed air) around and/or surrounding and/or into the combustion chamber, in particular regarding its influence on damping oscillations of particular frequencies. In particular, the controller may utilize a physical model of the combustion arrangement in order to determine the valve operating position such as to dampen a disturbing oscillation, in particular for damping the oscillation of the combustion arrangement having the highest amplitude or having the worst influence on the components of the combustion arrangement, in particular regarding damage of these components.

Thereby, the combustion arrangement may be securely and may effectively be operated.

According to an embodiment of the present invention, the controller is adapted to adjust the valve operating position based on a detected oscillation of the combustion chamber, the casing and/or the combustion arrangement and/or based on a combustion chamber exit temperature (a, in particular measured and/or simulated, temperature of the burnt mixture of fuel and the oxidant exhausted from the combustion chamber) and/or based on the ingoing fluid flow (in particular flow rate or mass flow rate) of the oxidant and/or based on a fuel flow (volume flow or mass flow rate) supplied into the combustion chamber and/or based on a material and/or a geometry of the arrangement.

In particular, the controller may perform a physical simulation of the combustion arrangement in order to determine oscillations of the arrangement and to determine the appropriate fluid flow through the valve in order to dampen disturbing oscillations. Thereby, the damping function may further be improved.

According to an embodiment of the present invention, the partitioning wall is axially arranged downstream, as defined by a flow direction of a combustion product exhausted by the combustion chamber, of a center of the combustion chamber (wherein in particular in the center or downstream the center of the combustion chamber a flame is ignited and maintained representing a chemical reaction between the fuel and the oxidant). Thereby, under nominal conditions the partitioning wall may not significantly disturb the ingoing fluid flow of the oxidant into the combustion chamber in order to improve the efficiency of the combustion arrangement. In particular, a plurality of combustion chambers may be annularly arranged around the axial direction. Further, the partitioning wall may be an annular (in particular perforated) plate arranged downstream of the plurality of combustion chambers.

According to an embodiment of the present invention, the aperture (or the pluralities of apertures) of the partitioning wall comprises a tapered shape. Thereby, the shape of the wall may influence the characteristics of the fluid flow through the aperture, in order to achieve an improved controlling of the fluid flow and/or a still improved damping effect.

According to an embodiment of the present invention, the partitioning wall further comprises at least one further aperture (or a plurality of further apertures), wherein the one further aperture is in particular arranged at a radial position different from a radial position of the aperture (or the plurality of apertures), wherein in particular the aperture and the further aperture comprise counter-directional tapered shapes (providing an increasing or decreasing cross-sectional area or size along a path through the partitioning wall) or straight shapes (providing an at least approximately constant cross-sectional area or size along a path through the partitioning wall).

Thereby, a portion of the ingoing fluid flow introduced via the first volume portion into the second volume portion, may flow back from the second volume portion to the first volume portion. For each flow direction (either from the first volume portion to the second volume portion or from the second volume portion to the first volume portion) either the aperture or the further aperture may be preferred due to the shape (and/or positioning) of the aperture and the further aperture. Thereby, the fluid flow may be directed from the first volume portion to the second volume portion and from the second volume portion to the first volume portion in a more controlled manner. Thereby, the damping effect may even further be improved.

According to an embodiment of the present invention, the partitioning wall circumferentially surrounds a longitudinal axis (or axial direction) of the combustion chamber. Thereby, in particular a ring-shaped (perforated) plate may be provided as the partitioning wall, wherein in particular two rings of apertures are formed, which have different radii. In particular, the plurality of apertures and also the plurality of further apertures may be spaced apart in the circumferential direction, wherein the circumferential distance between two apertures may be constant and wherein a circumferential distance between two further apertures may also be constant.

In particular, the partitioning wall may be attached at a radially inner portion of the casing at a first axial position and may be attached to a radially outer portion of the casing at a second axial position, wherein the second axial position is downstream of the first axial position. In particular, a surface of the partitioning wall comprising the aperture and/or the further aperture, may comprise a surface normal vector, which is tilted with respect to the axial direction. In particular, the tilt angle may be between 10' and 50°, in particular between 20° and 45°.

According to an embodiment, a turbine, in particular a gas turbine, is provided, wherein the turbine comprises a combustion arrangement according to one of the above described embodiments. Thereby, the efficiency of the turbine may be improved compared to a conventional turbine. Further, the lifetime of components of the turbine may be prolonged compared to a conventional turbine.

According to an embodiment of the present invention, the turbine comprises a high pressure turbine section (comprising a number of guide vanes connected to the casing and also rotor blades connected to a rotor rotatably mounted relative to the casing) being driven by a burnt mixture of fuel and the oxidant from or out of the combustion chamber, wherein a casing portion at least partially delimiting the second volume portion is in thermal contact with a high pressure section passage way of the exhausted burnt mixture. Thereby, the ingoing fluid flow introduced into the second volume portion, may effectively cool components delimiting the high pressure section passage way, in order to improve the efficiency of the turbine.

It should be understood that features (individually or in any combination) disclosed, described, employed or mentioned with respect to an embodiment of an combustion arrangement, may also be applied, employed for or used for a method for operating the combustion arrangement and vice versa.

According to an embodiment of the present invention, a method for operating a combustion arrangement is provided, wherein the method comprises allowing a fluid communication between a first volume portion and a second volume portion, wherein the first volume portion and the second volume portion are provided by partitioning an inner casing volume of a casing using a partitioning wall, wherein in the casing a combustion chamber is arranged; allowing an outgoing fluid flow from the inner casing volume to flow outside of the casing depending on a valve operating position, wherein a combustion entry port for supplying an oxidant into the combustion chamber is in fluid communication with the first volume portion; and adjusting the valve operating position for damping an oscillation of the arrangement.

It has to be noted that embodiments of the invention have been described with reference to different subject matters. In particular, some embodiments have been described with reference to method type claims whereas other embodiments have been described with reference to apparatus type claims. However, a person skilled in the art will gather from the above and the following description that, unless other notified, in addition to any combination of features belonging to one type of subject matter also any combination between features relating to different subject matters, in particular between features of the method type claims and features of the apparatus type claims is considered as to be disclosed with this document.

Embodiments of the present invention are now described with reference to the accompanying drawings. The invention is not limited to the described or illustrated embodiments.

DETAILED DESCRIPTION

Figure 1:
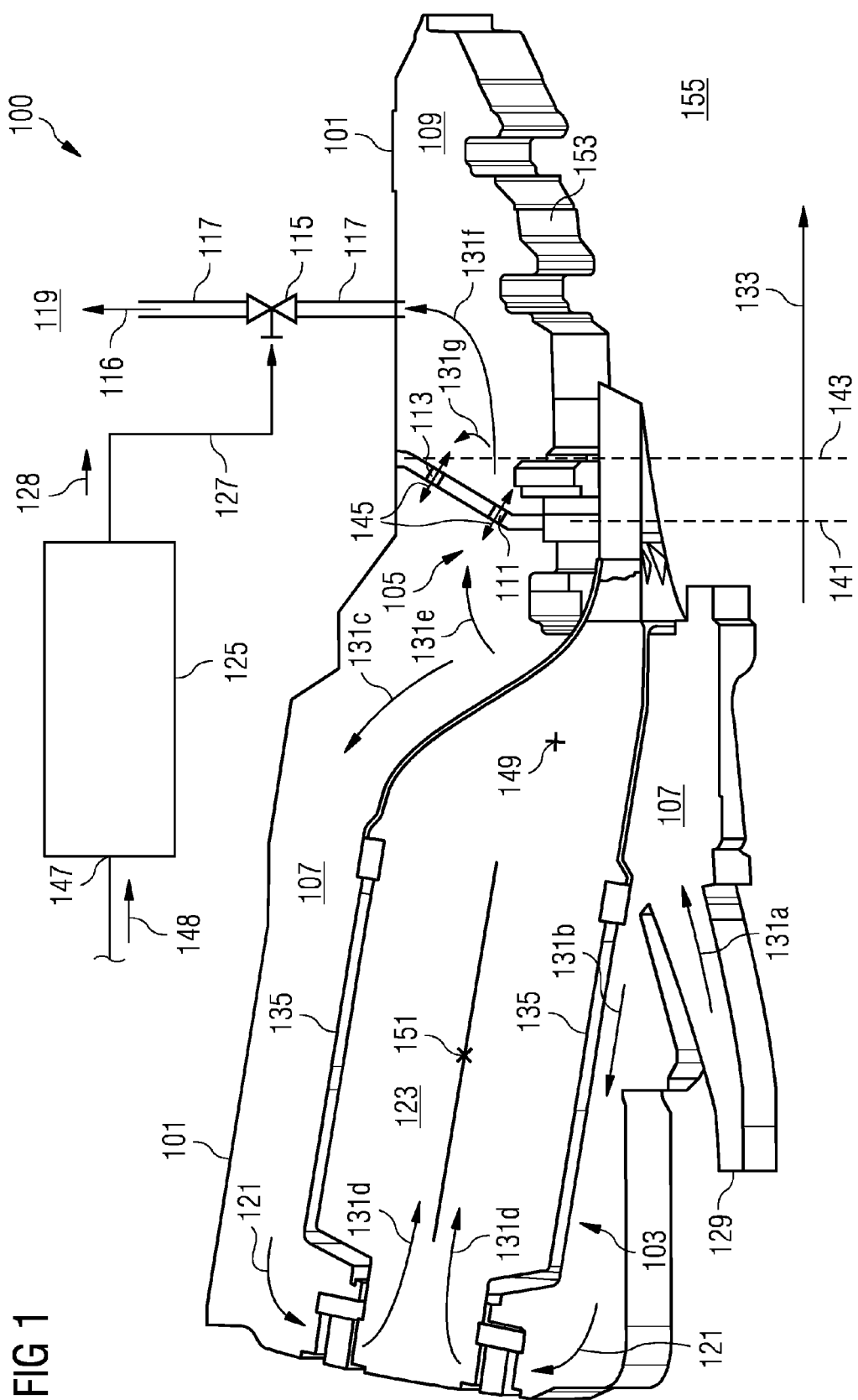
FIG. 1 schematically illustrates a cross-sectional (partially perspective) view of a combustion arrangement according to an embodiment of the present invention.

The combustion arrangement 100 according to an embodiment of the present invention illustrated in FIG. 1 comprises a casing 101, a combustion chamber 103 arranged within the casing 101, a partitioning wall 105 partitioning an inner casing volume into a first volume portion 107 and a second volume portion 109, wherein the partitioning wall 105 has at least one aperture 111, 113 for allowing fluid communication between the first volume portion 107 and the second volume portion 109. Further, the combustion arrangement 100 comprises a valve 115, which is arranged at the casing 101 (in particular at a casing wall of the casing 101) and allows via a pipe 117 an outgoing fluid 131f, 116 from the second volume portion 109 of the inner casing volume to flow outside 119 of the casing 101.

The combustion chamber 103 has a combustion entry port 121 for supplying an oxidant, in particular compressed air, into the combustion chamber, in particular into an inside 123 of the combustion chamber 103. The combustion entry port 121 is in fluid communication with the first volume portion 107.

The arrangement 100 further comprises a controller 125, which is adapted to adjust the valve operating position of the valve 115 via the control line 127 by sending a control signal 128 for damping an oscillation of the combustion arrangement 100. The controller 125 may be operated according to a number of different operation modes as will be explained below.

The casing 101 further comprises a casing entry port 129 for supplying compressed air into the first volume portion 107, wherein the compressed air flows along the direction as indicated by arrows 131, in particular, by arrows 131a, 131b, 131c, 131d and 131e. In particular the compressed air entered at the casing entry port 129, flows along the direction 131a, which has a component along the downstream direction 133, which represents an axial direction of the combustion arrangement 100, wherein the combustion arrangement 100 in particular comprises a number (such as 12) combustion chambers 103, which are annularly arranged around the axial direction 133.

After having flown along the direction 131a (at least partially along the downstream direction 133), the compressed air turns its direction to flow along the direction 131b, which is opposite (or at least partially opposite) to the downstream direction 133, thus having a flow component in the upstream direction. Further, the compressed air also flows around or surrounds the combustion chamber 103 along the direction 131c, wherein the fluid flow of the compressed air is in contact with an outer wall 135 of the combustion chamber.

A portion of the compressed air entered (via the casing entry port 129) into the first volume portion 107 is directed towards the partitioning wall 105 as is indicated by the flow direction arrow 131e.

Figure 2:
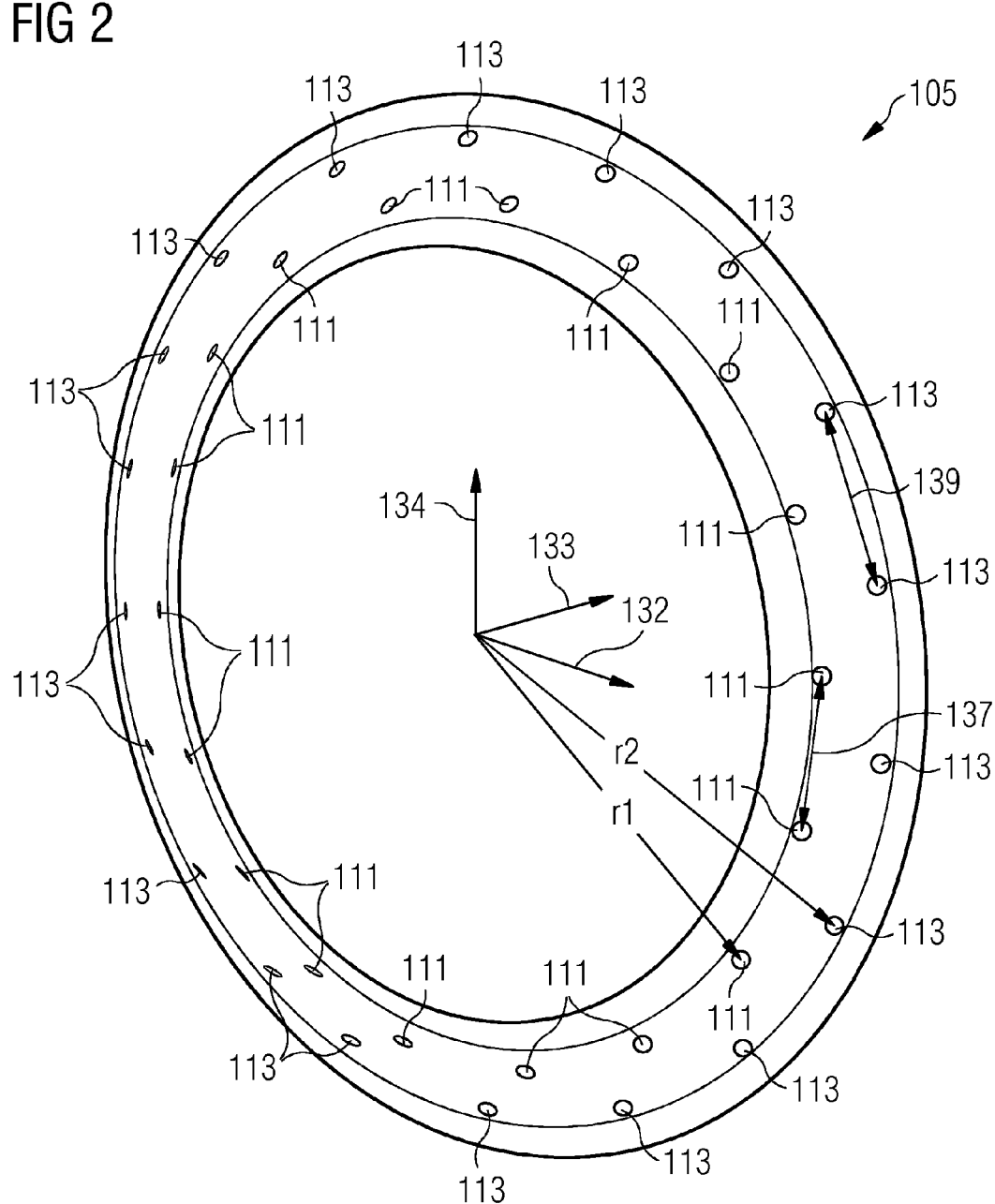
FIG. 2 illustrates a perspective view of a partitioning wall (in particular perforated partitioning plate), which is used in the combustion arrangement illustrated in FIG. 1.

The partitioning wall 105 is also illustrated in a perspective view in FIG. 2 in more detail. The partitioning wall 105, which is here implemented as a perforated plate 105, comprises a number of apertures 111, which are at a radial position r1 and further comprises a number of apertures 113, which are arranged at a different radial position r2. As can be seen from FIG. 2, all apertures 111 are at the same radial position r1 and all apertures 113 are at the same radial position r2. Thereby, the first apertures 111 are circumferentially spaced apart by a distance 137, while the second apertures 113 are circumferentially spaced apart by a distance 139. The radial directions lie in a plane spanned by directions 132, 134, being perpendicular to the axial direction 133. The perforated plate 105 has a ring structure having a symmetry axis along the axial direction 133.

As can be seen from FIG. 1 and also from FIG. 2, the perforated plate 105 is attached at a radially inner portion of the casing 101 at a first axial position 141 and is attached to the radially outer portion of the casing 101 at a second axial position 143, which is downstream relative to the first axial position 141.

The apertures 111, 113 may be straight apertures through the partitioning wall 105 or they may be tapered such that at the first volume portion or at the second volume portion the cross-sectional area or size of the apertures 111, 113 is larger than at the other side of the partitioning plate. Furthermore the apertures 111, 113 in the partitioning wall 105 may have different shapes e g circular, elliptical, triangular square, polygon shaped etc.

As is illustrated by double arrows 145, the compressed air introduced into the first volume portion 107 may pass through the apertures 111, 113 to reach the second volume portion 109 along a direction 131f or 131g. In particular, the portion 131e of the compressed air flowing from the first volume portion 107 to the second volume portion 109, may amount to between 0% and 20% of a total ingoing flow of the compressed air entered into the inner casing volume at the casing entry port 129.

A portion (portion 131g, 116) of the compressed air introduced to the second volume portion 109 along direction 131e is flowing back through the apertures 111 or/and 113 to the first volume portion 107. Another portion 131f of the compressed air, which is introduced into the second volume portion 109, is exhausted via the pipe 117 and the valve 115 to flow outside of the casing 109.

The amount of compressed air 131f exhausted via the valve 115, is controlled by the operating position of the valve 115 which in turn is controlled by the controller 125 according to a number of control modes.

In a first control mode, the valve 115 is adjusted by the controller such that the (remaining) mass flow into or around the combustion chamber or into the first volume portion or the second volume portion is determined so that a constant combustion exit temperature is maintained across the load range of the combustion arrangement 100. For this control mode, the controller 125 may receive, using an input terminal 147, a signal 148 indicative of the actual or simulated combustion exit temperature.

At the same time, the controller may control the valve operating position of the valve 115 in order to damp an oscillation of the combustion arrangement 100 having a particular unwanted frequency or a disturbing frequency with a high amplitude.

According to a second control mode, the controller sets the valve operating position of the valve 115 such that a predefined mass flow of the compressed air through the bleed valve 115 across the load range is set.

In any of the control modes, the extracted flow from the bleed can be either diverted into the compressor inlet section, to a compressor section or to a turbine section (when the combustion arrangement is used within a gas turbine) or to an exhaust section.

According to a third control mode, a closed loop control of the mass flow behind the perforated plate 105 is implemented in the controller 125. Therefore, the controller 125 receives signals 148 relating to the combustion dynamics (for example from existing engine instrumentation) as a main input parameter. Further input parameters may comprise the combustion exit temperature, for example determined by existing engine instrumentation. In the third control mode, the controller 125 determines the response to the received input parameters by controlling the bleed valve position of the valve 115. In particular, for increasing the frequency of an oscillation to be damped, the valve operating position may be adjusted in order to increase the mass flow of the compressed air 131$f$ through the valve 115 to the outside 109 of the casing 101.

In any of the control modes, the extracted flow from the bleed can be either diverted into the compressor inlet (when the combustion arrangement is used within a gas turbine) or into exhaust.

Embodiments of the present invention may change the natural frequency of the combustion chamber or the whole combustion arrangement, so that it cannot be amplified by the combustion chamber or by the flame at the flame position 149 within the combustion chamber 103. The center 151 of the combustion chamber 103 is also indicated. Further, embodiments of the present invention will direct some flow 131$f$ of the compressed air to hot parts 153 (representing a portion of a casing wall of the casing 101) or to components which are close to the parts 153, such as nozzle guide vanes and/or nozzle guide carrier rings. In particular, heat transfer via convection in the second volume portion 109 or a downstream region 155 may be improved further improving cooling function.

Further due to the damped oscillations, the lifetime of the components of the combustion arrangement or the turbine may be prolonged. In particular, embodiments of the present invention aim to actively damp amplitudes of key frequencies from the casing 101, the combustion chamber 103 or other components of the combustion arrangement 100 by using the perforated plate 105 and the bleed valve 115 employing a closed loop algorithm that will determine the mass flow required to bleed and/or a temperature inside the combustion chamber 103 or the casing 101.

It should be noted that the term "comprising" does not exclude other elements or steps and "a" or "an" does not exclude a plurality. Also elements described in association with different embodiments may be combined. It should also be noted that reference signs in the claims should not be construed as limiting the scope of the claims.

The invention claimed is:

1. A combustion arrangement comprising:
a casing;
a combustion chamber arranged within the casing, wherein an inner casing volume is defined to be a volume inside the casing but outside the combustion chamber;
a partitioning wall partitioning the inner casing volume into a first volume portion and a second volume portion, the partitioning wall having at least one aperture to allow fluid communication between the first volume portion and the second volume portion; and
a valve arranged at the casing to allow an outgoing fluid flow from the inner casing volume to an outside of the casing depending on a valve operating position;
wherein the combustion chamber has a combustion entry port for supplying an oxidant into the combustion chamber, wherein the combustion entry port is in fluid communication with the first volume portion,
wherein the arrangement is adapted to adjust the valve operating position for damping an oscillation of the arrangement.

2. The combustion arrangement according to claim 1, wherein the valve is arranged to allow the fluid flow from the second volume portion to flow outside of the casing depending on a valve operating position.

3. The combustion arrangement according to claim 1, wherein the casing further comprises a casing entry port for supplying an ingoing fluid flow of the oxidant into the first volume portion,
wherein the valve is adapted to adjust the valve operating position such that a range from 0% to 20% of the ingoing fluid flow of the oxidant supplied to the first volume portion is lead via the second volume portion, to flow outside of the casing.

4. The combustion arrangement according to claim 3, wherein the range is from 0% to 10%.

5. The combustion arrangement according to claim 1, wherein the combustion arrangement is adapted to adjust the valve operating position based on amplitude of the oscillation.

6. The combustion arrangement according to claim 5, wherein the combustion arrangement is adapted to adjust the valve operating position to increase the fluid flow through the valve, if the amplitude of oscillation to be damped increases.

7. The combustion arrangement according to claim 5, further comprising:
a controller communicatively connected to the valve, wherein the controller is adapted to adjust the valve operating position based on an operating state of the combustion arrangement.

8. The combustion arrangement according to claim 7, wherein the controller is adapted to adjust the valve operating position based on a detected oscillation of the combustion chamber, the casing and/or the combustion arrangement and/or based on a combustion chamber exit temperature and/or based on the ingoing fluid flow of the oxidant and/or based on a fuel flow supplied into the combustion chamber and/or based on a material and/or a geometry of the arrangement.

9. The combustion arrangement according to claim 1, wherein the partitioning wall circumferentially surrounds a longitudinal axis of the combustion chamber.

10. The combustion arrangement according to claim 1, wherein the partitioning wall further comprises:
at least one further aperture, wherein the one further aperture is arranged at a first radial position different from a second radial position of the aperture, wherein the aperture and the further aperture comprise counter-directional tapered shapes.

11. The combustion arrangement according to claim 1, wherein the aperture of the partitioning wall comprises a tapered shape.

12. The combustion arrangement according to claim 1, wherein the partitioning wall is axially arranged downstream, as defined by a flow direction of a combustion product exhausted by the combustion chamber of a center of the combustion chamber.

13. A gas turbine comprising the combustion arrangement according to claim 1.

14. The turbine according to claim 13, comprising a high pressure turbine section being driven by an burnt mixture of fuel and the oxidant exhausted by the combustion chamber, wherein a casing portion at least partly delimiting the second volume portion is in thermal contact with a high pressure section passageway of the exhausted burnt mixture.

15. A method for operating a combustion arrangement as claimed in claim 1, comprising adjusting the valve operating position for damping an oscillation of the arrangement.

* * * * *